(12) United States Patent
Baldini et al.

(10) Patent No.: US 9,864,644 B2
(45) Date of Patent: Jan. 9, 2018

(54) SYSTEM AND METHOD FOR TRANSPORT LAYER AGNOSTIC PROGRAMMING INTERFACE FOR USE WITH SMARTPHONES

(71) Applicant: MYINE ELECTRONICS, INC., Ferndale, MI (US)

(72) Inventors: Massimo Baldini, Beverly Hills, MI (US); Andrew T. Lenox, Pleasant Ridge, MI (US); Jacob R. Sigal, Ferndale, MI (US); Philip J. Danne, Royal Oak, MI (US); Scott W. Smereka, Warren, MI (US); Joey R. Grover, Elwell, MI (US)

(73) Assignee: Livio, Inc., Royal Oak, MI (US)

( * ) Notice: Subject to any disclaimer, the term of this patent is extended or adjusted under 35 U.S.C. 154(b) by 216 days.

(21) Appl. No.: 14/742,184

(22) Filed: Jun. 17, 2015

(65) Prior Publication Data
US 2015/0286509 A1    Oct. 8, 2015

Related U.S. Application Data

(63) Continuation of application No. 13/939,482, filed on Jul. 11, 2013, now Pat. No. 9,078,088.

(60) Provisional application No. 61/670,745, filed on Jul. 12, 2012.

(51) Int. Cl.
| | |
|---|---|
| G06F 3/0484 | (2013.01) |
| G06F 9/54 | (2006.01) |
| H04W 4/00 | (2009.01) |
| H04M 7/00 | (2006.01) |
| H04M 1/60 | (2006.01) |

(52) U.S. Cl.
CPC .............. *G06F 9/54* (2013.01); *G06F 3/0484* (2013.01); *H04M 7/0012* (2013.01); *H04W 4/008* (2013.01); *H04M 1/6091* (2013.01)

(58) Field of Classification Search
CPC .................................. G06F 9/54; G06F 3/0482
See application file for complete search history.

(56) References Cited

U.S. PATENT DOCUMENTS

| | | | | |
|---|---|---|---|---|
| 7,266,435 | B2 * | 9/2007 | Wang | G07C 5/085 455/420 |
| 2012/0323590 | A1 * | 12/2012 | Udani | G06Q 10/103 705/2 |

* cited by examiner

Primary Examiner — Tuan H Nguyen
(74) Attorney, Agent, or Firm — Jennifer M. Stec; Brooks Kushman P.C.

(57) ABSTRACT

An application programming interface (API) is disclosed for interfacing a vehicle electronic component with a smartphone, wherein the vehicle electronic component and the smartphone each make use of a short range wireless transceiver for wirelessly communicating with the other, and wherein the smartphone includes an application running thereon. The API has an interconnect API disposed in the electronic component. The interconnect API also has a software library of command and function definitions that are able to be implemented by the API. A connect library is also used which resides within the smartphone and which is configured to communicate with the application running on the smartphone. The interconnect API and the connect library cooperatively operate as a translation mechanism to implement a plurality of functionalities when communicating with the application, according to the electronic device's capabilities.

19 Claims, 3 Drawing Sheets

SYSTEM AND METHOD FOR TRANSPORT LAYER AGNOSTIC PROGRAMMING INTERFACE FOR USE WITH SMARTPHONES

CROSS-REFERENCE TO RELATED APPLICATIONS

This application is a continuation of U.S. application Ser. No. 13/939,482, filed Jul. 11, 2013, published as US 2014/0018129, now U.S. Pat. No. 9,078,088 issued Jul. 7, 2015, which, in turn, claims the benefit of U.S. provisional application Ser. No. 61/670,745, filed on Jul. 12, 2012, the disclosures of which are hereby incorporated in their entirety by reference herein.

TECHNICAL FIELD

The present disclosure relates to application programming interfaces, and more particularly to an application programming interface that enables various types of user devices, such as a vehicle radio, to be interfaced to a user's smartphone and to implement a variable number of functionalities from an application running on the smartphone, according to the device's own hardware capabilities.

BACKGROUND

The statements in this section merely provide background information related to the present disclosure and may not constitute prior art.

Smartphones are presently gaining tremendously in popularity, in part for their ability to provide a plethora of diverse applications. One such application is streaming music over a cellular network to the smartphone. This application can also be used when the user is traveling in a motor vehicle such as an automobile or truck. Often the vehicle will have a Bluetooth connection system by which a wireless connection can be made between the vehicle's audio system and the user's smartphone. The smartphone can wirelessly stream audio content that it receives via a cellular network to the user's vehicle audio system, which enables the audio content to be played back over the vehicle's audio system. If a WiFi signal is available, then the audio content could be streamed in to the smartphone over a WiFi link. Likewise, even a computing tablet, laptop or other form of electronic device could be used to receive streamed audio content in the vehicle, but for the purpose of this discussion it will be assumed that the user's electronic device is a smartphone.

In the above example, it would be highly desirable to be able to control the various functions (e.g., "Play", "Tag", "Search") that are often provided with such applications from the vehicle's audio system controls. However, since various vehicle audio systems have differing capabilities as far as controls and the user/machine interface that they employ, this raises significant challenges. In other words, heretofore, a specific application programming interface ("API") has been required to interface a specific type of device (e.g., a specific manufacturer's vehicle audio system), having specific control/display capabilities, with the controls recognized by an application running on a user's smartphone. For example, a specific make of vehicle audio system having a simple seven segment LCD display may not have nearly the wide range of functionality that a system may have that implements a touch screen radio HMI (Human/Machine Interface). And a system that simply has a small plurality of physical user buttons may have even less functionality than the seven segment LCD display mentioned above. In each of these examples, a different API would need to be employed that accommodates, and is tailored to, the functionality of the user's device. So the challenge becomes how to enable a number of diverse devices, having differing functionalities and different types of user interfaces, to control a given application running on the user's smartphone, through the use of a single API. Conversely, the other challenge is having a plethora of smartphone applications with highly variable functionalities to be remotely controlled by said devices through the same single point of control, the API.

SUMMARY

In one aspect the present disclosure relates to an application programming interface (API) for interfacing a vehicle electronic component with a smartphone, wherein the vehicle electronic component and the smartphone each make use of a short range wireless transceiver for wirelessly communicating with the other, and wherein the smartphone includes an application running thereon. The API may comprise an interconnect API disposed in the electronic component. The interconnect API may include a software library of command and function definitions that are able to be implemented by the API. A connect library may also be included which resides within the smartphone and which is configured to communicate with the application running on the smartphone. The connect library may be at least substantially identical to the software library. A packet API may also be included for generating data packets according to a predetermined specification. The interconnect API and the connect library cooperatively operate as a translation mechanism for translating packets of information received from the electronic device, at least some of the packets forming commands, into commands recognizable by the application running on the smartphone, and to enable a predetermined desired response to the received commands, to thus enable the electronic device to implement a plurality of functionalities when communicating with the application according to the electronic device's capabilities.

In another aspect the present disclosure relates to an application programming interface (API) for interfacing a vehicle radio system with a smartphone, wherein the radio system has a user interface, and wherein the radio system and the smartphone each make use of a short range wireless transceiver for wirelessly communicating with the other, and wherein the smartphone includes an application running thereon. The API may comprise an interconnect API and a connect library. The interconnect API may be disposed in the radio system and may include a software library of command and function definitions that are able to be implemented by the API. The connect library may reside within the smartphone and may be configured to communicate with the application running on the smartphone. The connect library may be at least substantially identical to the software library and may include a packet API for generating data packets according to a predetermined specification. The interconnect API and the connect library may cooperatively operate as a translation mechanism to enable the application running on the smartphone to accommodate and operate in accordance with functional capabilities of the interface of the radio system.

In still another aspect the present disclosure relates to a method for interfacing a vehicle electronic component with a smartphone, wherein the vehicle electronic component and the smartphone each make use of a short range wireless transceiver for wirelessly communicating with the other, and wherein the smartphone includes an application running thereon. The method may include using an application programming interface (API) configured to include an interconnect API running on electronic device, and a connect library residing on the smartphone and communicating with an application running on the smartphone. A software library may be used which is in communication with the interconnect API, and operating on the component, to contain command and function definitions that are able to be implemented by the API. A connect library may be used which resides within the smartphone and which is configured to communicate with the application running on the smartphone. The connect library may be at least substantially identical to the software library. A packet API may be used for generating data packets according to a predetermined specification. The interconnect API and the connect library may be used to cooperatively operate as a translation mechanism to enable the application running on the smartphone to accommodate and operate in accordance with functional capabilities of the interface of the electronic device.

BRIEF DESCRIPTION OF THE DRAWINGS

The drawings described herein are for illustration purposes only and are not intended to limit the scope of the present disclosure in any way.

DETAILED DESCRIPTION

Figure 1A:
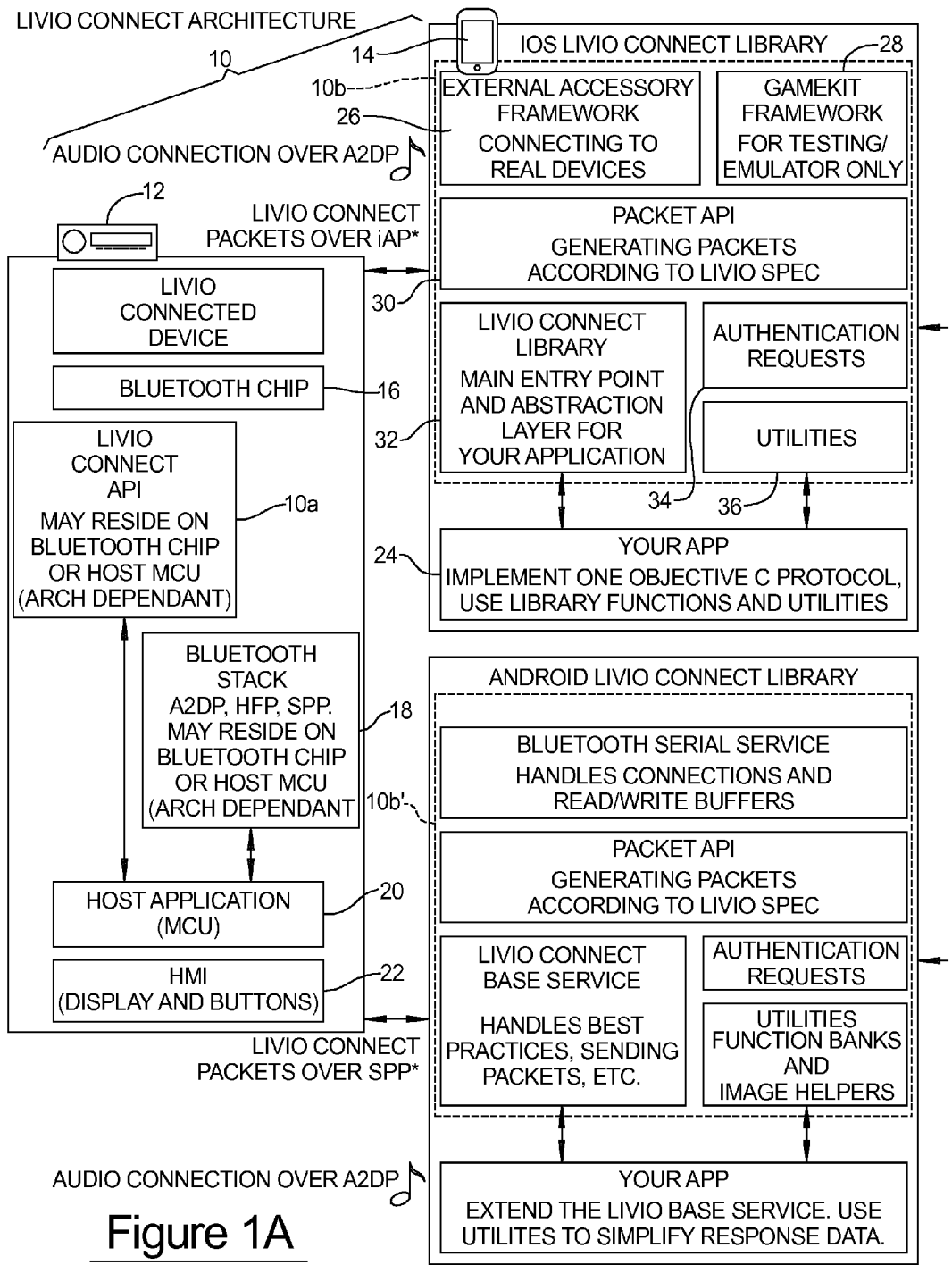
FIG. 1A-1B is a high level block diagram that illustrates one example of an environment in which an application programming interface (API) of the present system and method may be used to enable various functions and commands associated with operation of an application running on a user's smartphone to be implemented remotely on a vehicle radio system.

The following description is merely exemplary in nature and is not intended to limit the present disclosure, application, or uses. It should be understood that throughout the drawings, corresponding reference numerals indicate like or corresponding parts and features.

Figure 1B:
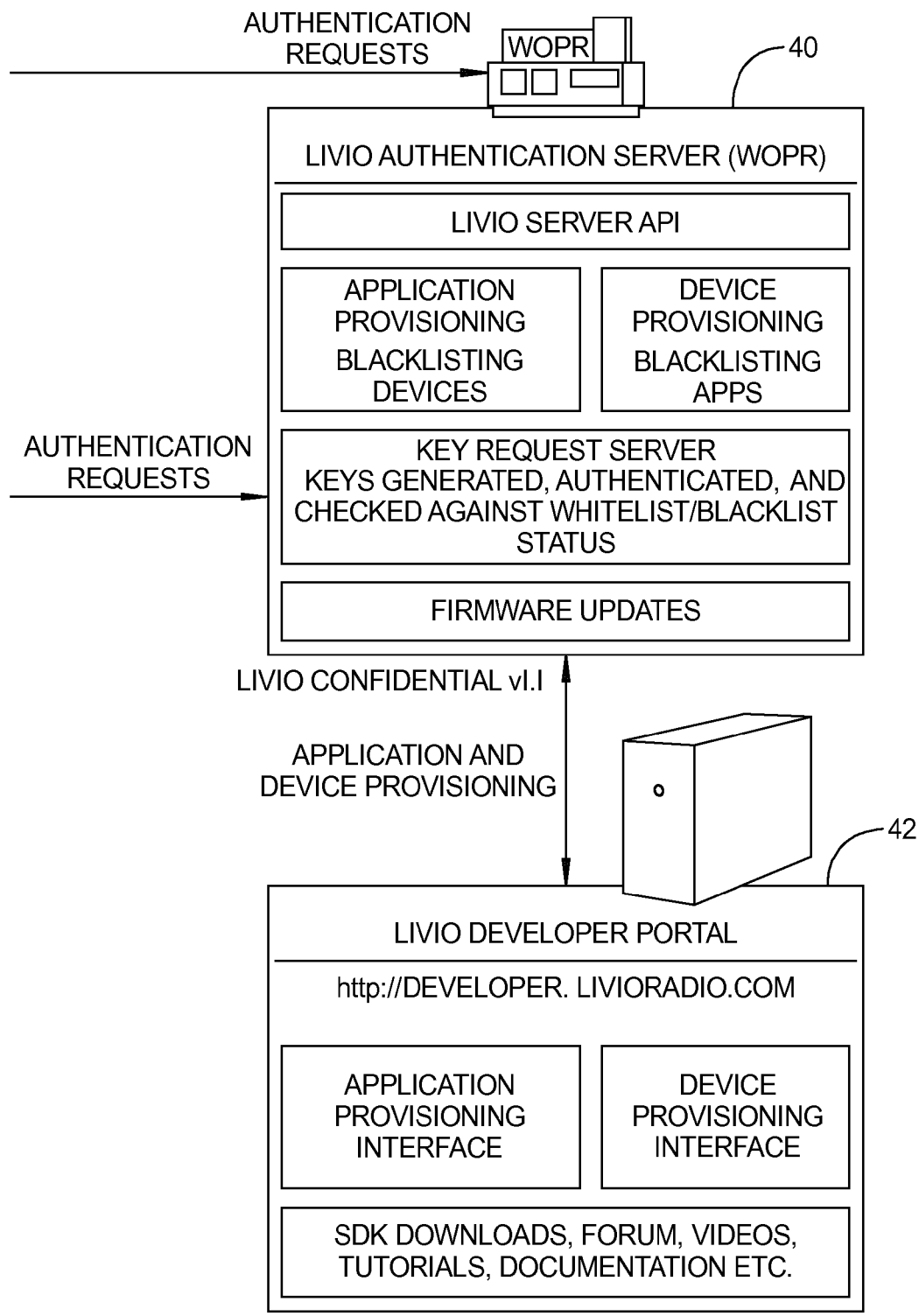

Referring to FIG. 1A-1B, a high level block diagram illustrates an application programming interface ("API") 10 of the present system and method being implemented within a vehicle radio 12 and within a smartphone 14 of a user. The API 10 includes an interconnect API 10a that resides within the radio 12, and a "connect library" 10b that resides within the smartphone 14. It will be appreciated that this is simply one specific implementation that the API 10 could be employed in. The API 10 could be used in virtually any implementation where some external component having some type of user interface is being used to remotely control an application running on a different electronic device (e.g., smartphone, computing tablet, laptop, etc.).

In the present example the radio 12 may include a Bluetooth® protocol chip 16 for making a wireless Bluetooth® protocol connection with the smartphone 14. A Bluetooth® protocol stack 18 includes software that implements the Bluetooth® protocol stack. A host application 20, which may reside in an MCU (micro controller unit), communicates with the connect API 10a and with the Bluetooth® protocol stack 18. A human-machine interface ("HMI") 22 may be included to enable the user to input various commands and/or functions that may be used to remotely control an application residing on the smartphone 14. The interconnect API 10a further includes a software library 32a of command and function definitions that can be implemented by the API 10.

The smartphone 14 in this example is running the iOS operating system from Apple, Inc. of Cupertino, Calif. The smartphone 14 may have an application 24 that communicates with the connect library 10b. The connect library 10b may include an external accessory framework 26 for connecting to real (i.e., actual) devices, a gamekit framework 28 for testing/emulator activities, a packet API 30 for generating packets according to a predetermined specification, and a connect library 32b which represents a main entry point and abstraction layer for the application 24 running on the smartphone 14. The connect library 32b is identical or nearly identical to the software library 32a in the interconnect API 10a. The libraries 32a and 32b effectively operate as both a translation mechanism to translate binary livio connect packets received into meaningful commands for the smartphone application, as well to enable correct response to the commands received. The connect library 10b may also include a utilities layer 36 for translating from abstract data structures that are meaningful to a smartphone application to binary packets used by the API in communication. FIG. 1A-1B also illustrates a similar interconnect library 10b' being used on a smartphone that employs the Android™ operating system from Google, Inc., of Mountain View, Calif. An authentication server 40 may be employed to handle tangential operations such as communicating firmware updates to the API 10, blacklisting specific types of devices or blacklisting specific types of applications. A developer portal may also be employed to give application developers the ability to blacklist specific hardware devices, and hardware device developers to blacklist specific smartphone applications.

Functions and number keys provide the primary function of the interconnect API 10. This lets devices implement a variable number of functionalities from an application according to its own abilities. Any application that fully implements the interconnect API 10 software libraries 32a and 32b will be able to operate using a wide variety of interfaces having various levels of sophistication and complexity. As one example, an application that fully implements the interconnect API 10 would be able to be used with anything from a highly sophisticated touchscreen HMI to a user interface having a simple set of buttons as part of, for example, a headphone cord.

It will also be appreciated that number keys differ from functions keys in that they are user inputs that are unable to show dynamic content. For example, a number key preset button with a silk-screened "1" on it cannot give the user any clue as to what it will do in the context of being connected to a given application. For this reason, the present API 10 separates the handling of functions and number keys into separate command types.

Some commands used with a given application are less general than others. For example, the command "TAG_CURRENT" is a function that tells the application 24 to take whatever is happening in the current context of the application and to save it for later use for the user. This function could easily also be added as a function key, but by providing more specific, widely used commands, this kind of redundancy allows the API 10 to be deployed on devices that do not have the ability to show a function list. The tradeoff of having to be able to respond to multiple commands (e.g., a TAG_CURRENT command versus a function that does the same thing), is small for applications. Put differently, it is highly feasible to repeat this functionality in the API 10, and the benefit is that the application 24 is afforded a high level of user remote control from a wide variety of devices having different levels of sophistication.

Figure 2:
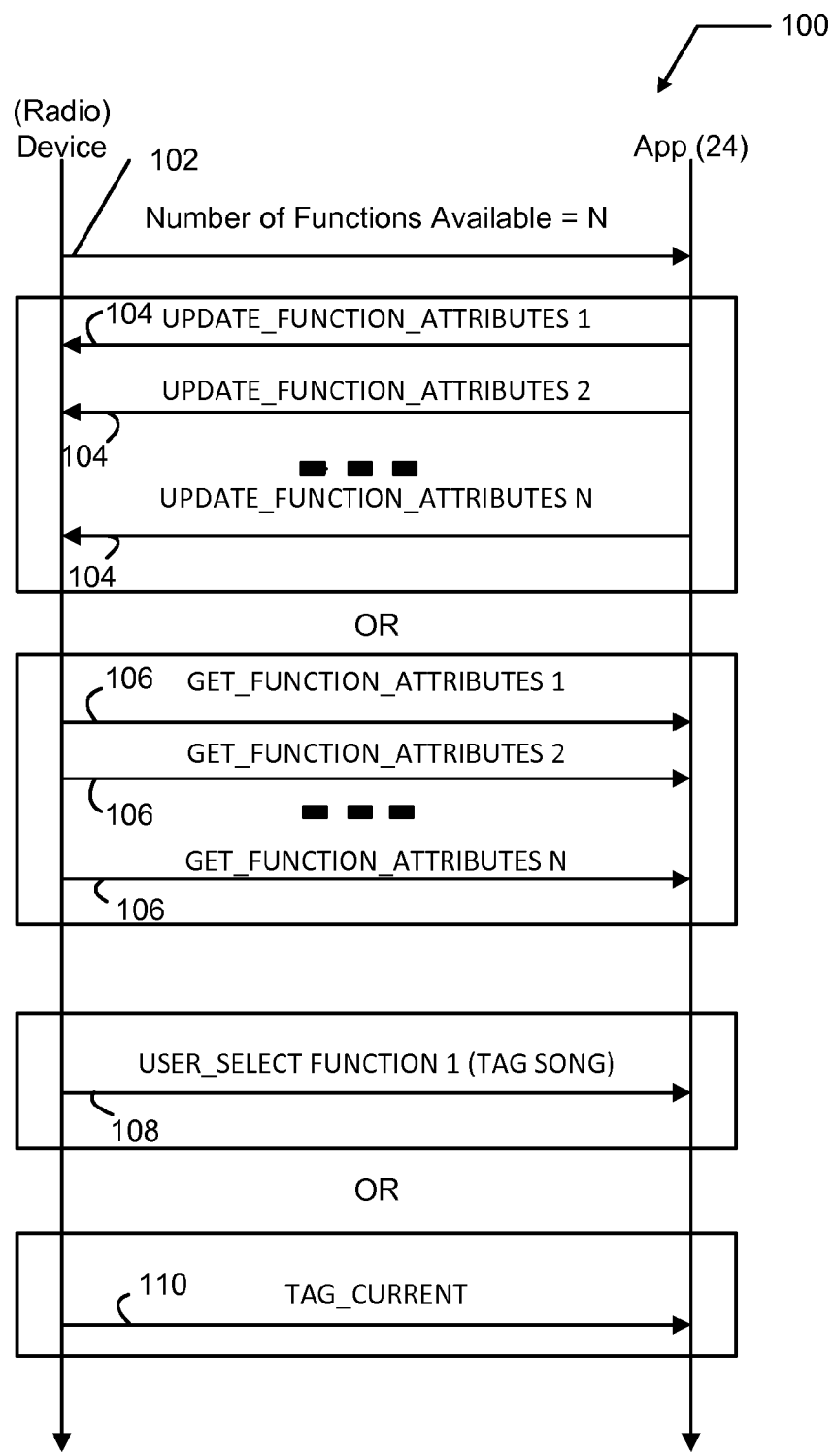
FIG. 2 is a diagram illustrating different sequences of operation that may occur when a device, such as the vehicle radio of FIG. 1A-1B, has different levels of functionality.

Referring to FIG. 2, a diagram 100 is shown to help describe how the API 10 is able to accomplish the same functionality with different redundant commands. In the first example, the device, in this example radio 12, initially sends a number "N" to the application 24, as indicated by line 102, where N represents the number of functions available that the radio 12 can support. In response, the application 24 dynamically adjusts its menu based on the number of functions that will be supported. The application 24 also then sends its function attributes for each of the total N functions back to the radio interconnect API 10*a* of the radio 12 using the connect library 10*b* in the smartphone 14. These function attributes may be streamed, one after another, until all N function attributes have been sent to the radio 12, as indicated by lines 104. If, for example, a device sends "0" as the number of functions (i.e., it has zero function keys), then this would mean that all functionality will need to come from other commands. As another example, a device might send "0xFF", which in this example is defined to be an infinite number of list items (i.e., an infinite number of functions). The application 24 would then be able to choose its maximum number of functions, or dynamically respond to requests for function attributes for arbitrarily large numbers. Put differently, if a device provides no maximum number of functions, that is infinite functions, then the application 24 may then choose to support this by just responding to any function number request. This means that the application 24 would be able to respond to, for example, 100, 10000 and 1000000, and all commands would have some meaning to that particular application 24. As yet another example, consider that the radio 12 is able to send "7" as the function number. The application 24 would then rearrange its function list to support seven visible presets (i.e., 7 function keys on the radio 12).

Each one of the function attributes that is sent to the device (i.e., radio 12 in this example) from the application, as evidenced by lines 104, tells the device a little about the functions that the application 24 supports. More specifically, each one of the function attributes represented by line 104 may include:

a "Function ID", which is a specific number assigned to the function;

an image update (True or False), which identifies whether the function has associated artwork;

a "Label", which is a short (e.g., 8-12 characters) description of the function; and a "Function Type" (0 or 1), which tells the device whether or not pressing a given button on it will update the function bank in some way. (This is useful for the device to display some indication to users that this is a menu option.)

Using function attributes, the device doesn't need specific knowledge of the application's 24 operation. The device will be able to perform any of the following actions:

USER_SELECT command containing the function identification will tell the application 24 which function was selected;

a USER_SET command containing the function ID which tells the application 24 that a function key was pressed and held for alternate operation;

USER_SEEK command which can change the current menu of functions;

a USER_SEEK with the value "UP" will return to the previous menu of functions; and a USER_SEEK with the value "HOME" will return to the base menu.

If the device (i.e., radio 12 in this example) cannot store the data, then it can simply ignore function attributes sent to it. Or alternatively, as indicated by lines 106 in FIG. 2, the device can obtain function attributes one by one from the application 24. The device does this by issuing a "GET_FUNCTION_ATTRIBUTES" command for a specific function ID whenever it needs the function attributes associated with a specific function ID. While not shown explicitly, it will be appreciated that after each function attributes request represented by any one of lines 106, the application 24 would send back to the device (i.e., radio 12) the function attributes associated with the specific function attributes number that was requested by the device. If a function does not exist for a requested function ID number, the command is NAK'ed (Negative Acknowledged) by the application 24, and the device will then know that there is no function for that specific function ID number that it just requested.

With further reference to FIG. 2, lines 108 and 110 represent how the API 10 enables one function, in this example tagging a song that is playing on the radio 12, to be commanded in two different ways. Line 108 represents the USER_SELECT function 1 (in this example representing "Tag Song") being sent to the application 24, which causes the application 24 to tag the currently playing song. Line 110 causes the application 24 to take the same action but instead by a specific command, in this example the "TAG_CURRENT" command.

It will be appreciated that function lists arise out of the fact that some devices only support a finite number of visible functions at once. So for instance, an Internet radio application may have 12 presets that it wants to show as function keys. It could then connect to a device that only supports 6 simultaneous functions on screen at once. The application 24 would then make two separate "function lists", which could alternatively be termed two "function banks" (i.e., function bank 1 and function bank 2, each having 6 functions), to represent all the functions it wishes to support. Since the device in this example can only issue the commands 1-6, the application 24 must maintain which function bank is the current active function bank, and interpret a "User_Select 1" as either User_Select 1 for function bank 1 or User_Select 1 for function bank 2.

By being able to handle specific commands as well functions, the API 10 can be implemented on devices of limited human interface/display sophistication that do not have the ability to display a function list. This provides the potential for the API 10 to be used in a wide variety of devices having different human interface mechanisms. Essentially, any type of device that has merely a few simple buttons with predetermined designations thereon (e.g., "PLAY", "STOP", etc.), to much more sophisticated devices able to implement dozens or even hundreds or more different functions through detailed menus, can be supported by the API 10. This means that devices such as vehicle radios from different manufacturers, and each have different function capabilities, may be supported by the API 10 with little or no modification to the API 10.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A mobile device comprising:
   at least one controller programmed to:
      receive, to an application of the mobile device from a vehicle, a number representing a quantity of functions that the vehicle can simultaneously support on a vehicle display;
      divide functions provided by the application into function banks each having up to the number of functions; and
      send function attributes of the functions of one of the function banks to the vehicle.

2. The mobile device of claim 1, wherein the at least one controller is further programmed to, in response to receiving a request for a second one of the function banks, transmit function attributes of the second one of the function banks to the vehicle for display.

3. The mobile device of claim 2, wherein the vehicle display is a user interface configured to display the at least one function bank of the one or more function groups based on the displayable number of functions.

4. The mobile device of claim 3, wherein the at least one controller is further programmed to, in response to receiving from the vehicle an indication of a selection from the vehicle display of one of the functions of the one of the function banks, execute the function by the application.

5. The mobile device of claim 1, wherein the vehicle display comprises a plurality of buttons, wherein the quantity of functions that the vehicle can simultaneously support is equal to a count of the plurality of buttons.

6. The mobile device of claim 1, wherein the quantity of functions is a total count of a number of function keys and number keys available at the vehicle display.

7. The mobile device of claim 1, wherein each one of the function attributes includes one or more of a function identification, an image associated with the function identification, a label associated with the function identification, and a function type.

8. A vehicle infotainment system comprising:
   a user interface supporting a predefined number of displayable functions; and
   a processor configured to,
      in response to establishing communication with a mobile application executed at a mobile device, transmit the predefined number to the application; and
      receive a function bank representing a subset of functions of the mobile application limited to the predefined number of displayable functions.

9. The vehicle infotainment system of claim 8, wherein the mobile application is configured to calculate a number of total functions provided by the mobile application, and divide the number of total functions into a plurality of function banks that are each limited to the predefined number of displayable functions.

10. The vehicle infotainment system of claim 9, wherein the processor is further configured to request a second function bank responsive to a request from a user via the user interface for a next set of functions.

11. The vehicle infotainment system of claim 10, in response to receiving a selection of one of the functions of the function bank, transmit a request to execute the one of the functions to the mobile application.

12. The vehicle infotainment system of claim 8, wherein the predefined number is a count of function keys and number keys of the vehicle infotainment system.

13. The vehicle infotainment system of claim 8, wherein the user interface includes a touchscreen and a plurality of buttons.

14. The vehicle infotainment system of claim 8, wherein each of the functions is defined by function attributes including at least one of a function identification, an image associated with the function identification, a label associated with the function identification, and a function type.

15. A non-transitory computer readable storage medium, storing instructions of an application that, when executed by a processor, program the processor to:
   receive from a vehicle, a number representing a quantity of functions that the vehicle can simultaneously support on a vehicle display;
   divide functions provided by the application into function banks each having up to the number of functions; and
   send function attributes of the functions of one of the function banks to the vehicle.

16. The computer readable storage medium of claim 15, wherein the instructions further program the processor to, in response to receiving a request for a second one of the function banks, transmit function attributes of a second one of the function banks to the vehicle.

17. The computer readable storage medium of claim 15, wherein each one of the function attributes includes one or more of a function identification, an image associated with the function identification, a label associated with the function identification, and a function type.

18. The computer readable storage medium of claim 15, wherein the instructions further program the processor to, in response to receiving a selection of a function, execute the requested function.

19. The computer readable storage medium of claim 15, wherein the quantity of functions is a count of a number of function keys and number keys of the vehicle.

* * * * *